SYNCHRONIZING MECHANISM FOR ENCRYPTING TELEGRAPH TRANSMITTER

Filed Feb. 24, 1965

INVENTOR
ROGER I. OSLUND
BY R. C. Terry
ATTORNEY

United States Patent Office 3,479,456 Patented Nov. 18, 1969

3,479,456

SYNCHRONIZING MECHANISM FOR ENCRYPTING TELEGRAPH TRANSMITTER

Roger I. Oslund, Glenview, Ill., assignor to Teletype Corporation, Skokie, Ill., a corporation of Delaware Filed Feb. 24, 1965, Ser. No. 434,884
Int. Cl. H04l 9/00, 15/00, 5/24
U.S. Cl. 178—22 6 Claims

ABSTRACT OF THE DISCLOSURE

In an encrypting telegraph device of the type including two tape controlled transmitters, one for transmitting message tapes and the other for transmitting encrypted tapes, and a pair of electromagnetically controlled latches for selectively permitting and preventing operation of the transmitters, a lever system operated by the encrypted tape transmitter upon the initiation of a cycle of operation thereof for tripping the latch of the message tape transmitter thereby preventing a termination of the operation of the message tape transmitter prior to a termination of the operation of the encrypted tape transmitter.

This invention relates to encrypting telegraph equipment and more particularly to means for synchronizing two telegraph transmitters operated from a common motive power source.

In encrypting telegraph equipment, it is usually the practice to operate two perforated-tape transmitters simultaneously. One of the tape transmitters senses a perforated tape containing the desired message, and the other tape transmitter senses another perforated tape containing a key or encrypting tape. The outputs from these two transmitters are then combined to produce the encrypted signal. These two transmitters must always be kept in synchronism so that each character in the message tape is sensed when its associated character in the key tape is sensed.

In order to keep these two transmitters in synchronism, it may be advantageous to operate both transmitters from the same rotating drive source with one of the transmitters controlling the rotating drive source as well as its own starting and stopping. One of the transmitters should be capable of transmitting an unencrypted message while the other transmitter, which normally transmits from the key tape, is idle. This permits the transmitting station to transmit either encrypted or unencrypted messages. The transmitter which operates during transmission of either type of message must therefore be the transmitter which controls the rotating drive source. Each transmitter should have its own control to engage or disengage the transmitter from the rotating drive source. If the two transmitters, being in operation to encrypt, are simultaneously signaled to stop transmission, the key-tape transmitter might not respond as quickly to this stop signal as the message-tape transmitter, due, perhaps to manufacturing and adjustment differences between the machines. This could result in the key-tape transmitter beginning a tape sensing cycle while the message-tape transmitter and the rotating drive source stop, which in turn might result in the key-tape transmitter stopping in the middle of a tape-sensing cycle. This would result in difficulty in reloading the key-tape transmitter stopped in mid-cycle or in advancing the tape in the key-tape transmitter.

It is an object of the present invention to keep synchronously-operating machines in synchronism.

It is another object of the present invention to assure that one of a pair of synchronously-operating transmitters starts a cycle of operation when the other starts a cycle of operation.

In accordance with the preferred embodiment of the invention, using two tape transmitters of the type disclosed in U.S. Patent No. 3,025,346, granted to R. E. Arko on Mar. 13, 1962, the transmitters are driven by a continuously-rotating drive source which drives the driven element of the drive clutch of the first of the two transmitters. This first transmitter controls the operation of the drive clutch. The second transmitter is without a separate drive clutch and is driven by the drive clutch of the first transmitter. Since the second transmitter does not directly control the drive clutch, a leverage system couples the main drive member of the second transmitter to the control devices of the first transmitter whereby the second transmitter triggers the start of the first transmitter whenever the second transmitter begins a cycle of operation.

A more complete understanding of the invention may be had from the following detailed description when considered in conjunction with the accompanying drawing wherein.

Figures 1, 2:
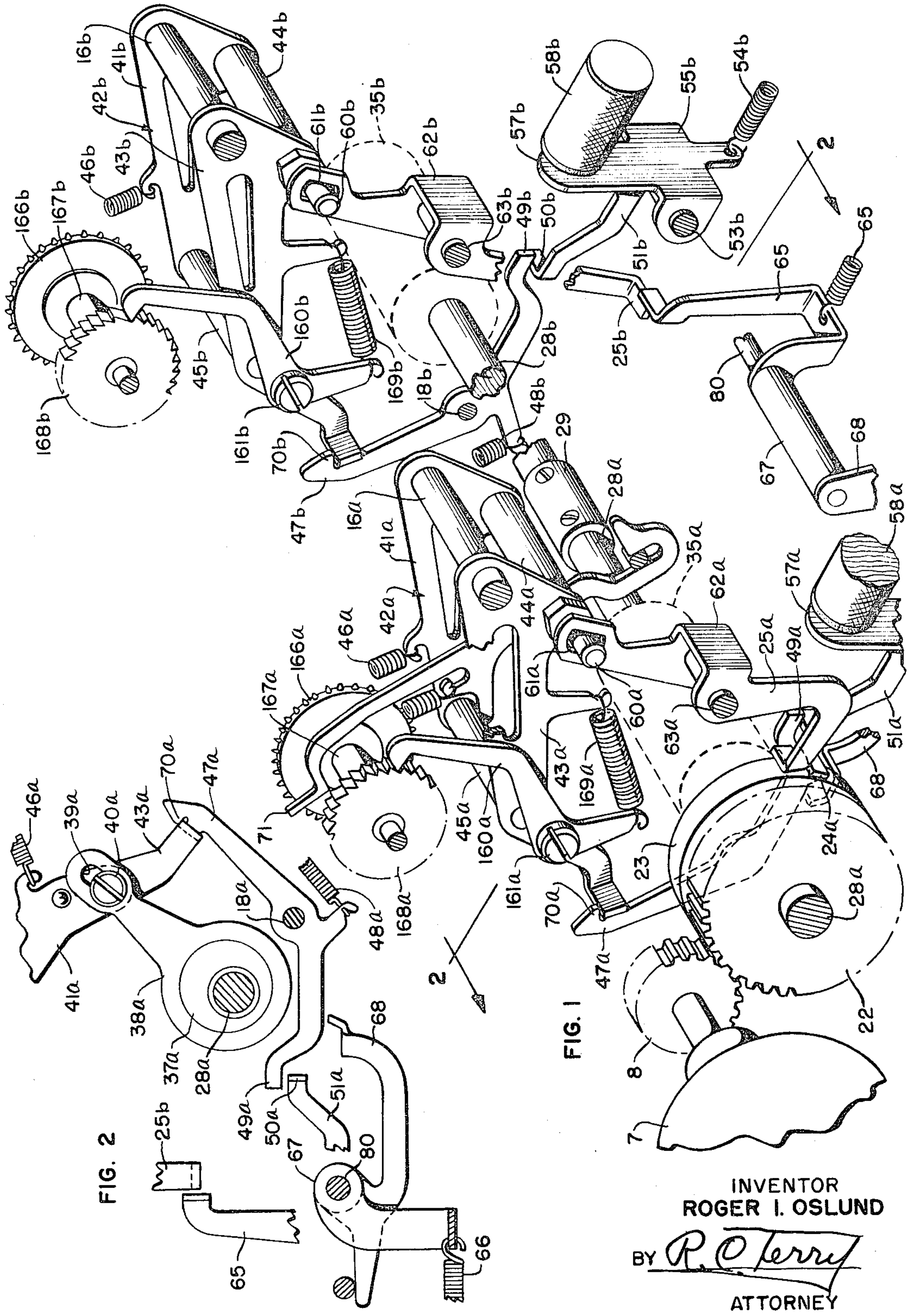
FIG. 1 is an isometric fragmentary view of the tripping and driving mechanisms of the two transmitters.
FIG. 2 is a section taken approximately along line 2—2 in FIG. 1 showing a detail of the means by which the start of operation of one transmitter triggers the start of operation of the other transmitter.

Referring now to the drawing, the reference numerals used in the Arko patent mentioned above to designate various parts of the transmitter have been retained to designate those of the corresponding parts that are shown in the drawing accompanying the present specification, with the addition of letter designations *a* and *b* to distinguish between the two transmitters used herein. The letter *a* designates elements of the message text transmitter, and the letter *b* designates parts of the key tape transmitter. In FIG. 1, continuously rotating drive for both transmitters is provided from a motor 7 through a pinion 8 and a drive gear 22. The gear 22 is freely rotatable on the shaft **28*a* on which it is carried, and the gear also has fixed to it a clutch drum 23 forming a part of a clutch mechanism such as that disclosed in detail in Patent No. 2,566,031, granted to A. N. Nilson on Aug. 28, 1951. This clutch includes a stop lug 24*a*, which when its movement is blocked by a clutch trip lever 25*a*, will effect the disengagement of the clutch drum 23 from the shaft 28*a* to which stop lug 24*a* is connected. Shaft 28*a* has fixed to it a cam sleeve 35*a* which provides timing and power for the message transmitter. Cam sleeve 35*a* includes an eccentric 37*a* (FIG. 2) for driving a drive link 38*a*. The drive link 38*a* has a slot 39*a* into which there extends a main bail drive pin 40*a*. The drive pin 40*a* is fixed to an arm 41*a* of a main driving bail 42*a* (FIG. 1) of the message transmitter. The main driving bail 42*a* consists of arm 41*a*, a longer arm 43*a*, cross-rods 44*a* and 45*a* interconnecting arms 41*a* and 43*a* in parallel and spaced relation thus forming the rigid bail structure 42*a*. Bail 42*a* is oscillatable about main bail pivot rod 16*a***.

The main bail **42*a* is urged to rock in a clockwise direction (FIG. 1) about the pivot rod 16*a* by a contractile spring 46*a*. However, the main bail 42*a* is under some conditions restrained by a main bail latch 47*a* from rocking in response to spring 46*a*. The main bail latch 47*a* is pivotally mounted on a post 18*a* (FIG. 2) and is urged to rotate in a counterclockwise direction (FIG. 2) by a contractile spring 48*a*. With bail arm 43*a* latched and eccentric 37*a* oriented as shown in FIG. 2, the drive link 38*a* is in its uppermost position and pin 40*a* is at the inner end of slot 39*a***. This is the idle or inactive condition of the message transmitter.

As shown in FIG. 2, the left end 49a of the main bail latch 47a is disposed above a laterally projecting portion 50a of an arm 51a of an armature lever 57a of an electromagnet 58a. The relationship among these elements is more clearly shown in FIG. 1 by the corresponding parts of the key tape transmitter wherein arm 51b is seen to be formed integrally with the armature lever 57b that is pivotally mounted on a pivot pin 53b and is biased to rotate in a counterclockwise direction about pin 53b by a spring 54b that is connected to a downwardly projecting portion 55b of armature lever 57b. The armature lever 57b is operatively associated with an electromagnet 58b which, upon being energized, rotates armature lever 57b and arm 51b clockwise about pivot pin 53b against the bias of spring 54b.

Referring again to the message text transmitter (FIG. 1), energization of the electromagnet 58a causes armature lever 57a to rock in a clockwise direction raising armature lever arm 51a and with it laterally projecting portion 50a (FIG. 2) into engagement with end 49a of the main bail latch 47a. This rocks latch 47a in a clockwise direction (FIG. 2) disengaging a latching shoulder 70a on the main bail latch 47a from the right-hand end of the arm 43a of the main driving bail 42a, permitting spring 46a to rock the main driving bail 42a in a counterclockwise direction (FIG. 2) until the drive pin 40a reaches the upper end of slot 39a in the drive arm 38a. The tape-sensing pins 71a–76a (shown only in fragmentary form herein but shown and described in the Arko patent mentioned above) have each a portion disposed below crossrod 45a, whereby they are held in their retracted or non-tape sensing positions when main driving bail 42a is restrained in its extreme clockwise position as viewed in FIG. 2, either by latch 47a or by eccentric 37a.

When the main driving bail 42a rocks clockwise (FIG. 1) under the urging of spring 46a, it permits the sensing pins to rise to sense the tape. It also moves a pin 60a, which extends from crossrod 44a, a short distance to the left. The pin 60a extends into a slot 61a in a clutch trip bail 62a which is pivoted on a pin 63a. Clutch trip lever 25a, hereinbefore identified as controlling the operation of clutch stop lug 24a, is the lower extension of clutch trip bail 62a, and when electromagnet 58a is energized, it releases main drive bail 42a which in turn rotates clutch trip bail 62a releasing stop lug 24a which permits the clutch to couple shaft 28a and cam sleeve 35a to gear 22 for continuous rotation as long as electromagnet 58a remains energized.

When main drive bail 42a rotates clockwise (FIG. 1) about pivot rod 16a, drive pin 161a, mounted on arm 43a, rises, carrying tape feed pawl 160a which is pivotally mounted on pin 161a. Tape feed pawl 160a is urged into engagement with a ratchet wheel 168a by a contractile spring 169a. Ratchet wheel 168a is firmly fixed to rotatable hub portion 167a, which also has secured thereto the tape feed sprocket 166a. When tape feed pawl 160a rises with the clockwise rotation of main drive bail 42a, tape feed pawl 160a engages the next tooth on ratchet wheel 168a. As shaft 28a and eccentric 37a rotate from the position shown in FIG. 2, drive link 38a pulls main drive bail 42a downwardly to its initial position, carrying with it tape feed pawl 160a. The downward movement of tape feed pawl 160a rotates ratchet wheel 168a and tape feed sprocket 166a through one step, advancing the message tape (not shown).

With electromagnet 58a energized, and electromagnet 58b not energized, only the *a* or message text transmitter will be activated, and the signals in the message text tape will be transmitted without encryption, because main drive bail 42b remains latched, and neither senses nor feeds the key tape while electromagnet 58b remains deenergized. When transmission of the plain text is to be terminated, electromagnet 58a is released. This permits main drive bail 42a to become latched when eccentric 37a, is approximately 180 degrees from the position shown in FIG. 2, and with the main drive bail latched, clutch drum 23 will be disengaged from stop lug 24a and shaft 28a when the eccentric has reached its initial or rest position, shown in FIG. 2.

When an encrypted message is to be transmitted, both magnets 58a and 58b are energized, releasing both main drive bail 42a and 42b. Release of main drive bail 42a trips the clutch as described hereinbefore. The clutch then couples shaft 28a to gear 22. Shaft 28b of the key tape transmitter is coupled by coupling 29 to shaft 28a for rotation therewith. So long as electromagnets 58a and 58b remain energized, latches 47a and 47b will be disengaged from their respective main drive bails and the rotation of shafts 28a and 28b will oscillate main drive bails 42a and 42b under the permissive control of their eccentrics, operating the message text transmitter and the key tape transmitter in perfect unison or synchronism.

When transmission is to be stopped, the energizing circuits for magnets 58a and 58b are interrupted, the magnets are released and main bail latches 47a and 47b latch main driving bails 42a and 42b when they have been drawn to their lowermost or counterclockwise positions (FIG. 1). However, due to possible manufacturing variations from unit to unit, including differences in the release times of the two electromagnets the key tape transmitter main drive bail 42b might fail to latch the cycle of shafts 28a and 28b in which main drive bail 42a becomes latched, with the result that the clutch would disengage with the shafts in their rest position while the main bail 42b of the key tape transmitter, being unrestrained, would rise to its limit position, with the sensing pins of the key tape transmitter extending upwardly into full engagement with the key tape. This could cause interference with the loading, unloading, and indexing of the key tape transmitter.

To prevent the key tape transmitter from stopping in midcycle of the main driving bail, a lever system is provided which assures that the main driving bail of the message transmitter is unlatched whenever the main driving bail of the key tape transmitter is in its uppermost or clockwise extreme. In the key tape transmitter, the solid coupling 29 hereinbefore described, has been substituted for a clutch like the clutch drum 23 of the message transmitter. Consequently, clutch trip bail 62b on the key tape transmitter does not perform the clutch tripping function for which it was originally intended. The shape of trip lever 26b has been changed to extend downwardly from the trip bail 62b to engage a restarting lever 65 which is secured to one end of a sleeve 67 rotatively supported on shaft 80. Restarting lever 65 is urged into engagement with trip lever 25b by spring 66. A latch trip lever 68 for main bail latch 47a of main bail 42a of the message text transmitter is secured to the other end of sleeve 67 (FIG. 2).

When the main driving bail 42b of the key tape transmitter rotates clockwise about main bail pivot rod 16b under the urging of contractile spring 46b, pin 60b on main drive bail 42b moves to the left (FIG. 1) rotating clutch trip bail 62b counterclockwise about pin 63b. This moves clutch trip lever 25b to the right against restarting lever 65 and rotates restarting lever 65 clockwise with sleeve 67 against spring 66. As shown in FIG. 2, movement of clutch trip lever 25b to the left rotates restarting lever 65, sleeve 67, and latch trip lever 68 counterclockwise against spring 66. When the right end of latch trip lever 68 strikes the bottom of main bail latch 47a, that latch rotates clockwise about post 18a releasing main driving bail 42a of the message transmitter independently of electromagnet 58a for one additional cycle.

During this one additional cycle, the main driving bail 42b of the key tape transmitter becomes latched by main bail latch 47b, because electromagnet 58b is now released. Similarly, arm 43a of the main driving bail 42a of the message text transmitter also becomes latched by its main bail latch 47*a*. Both transmitters remain in this idle condition so long as both electromagnets 58*a* and 58*b* remain deenergized. Energization of electromagnet 58*a* causes operation of only the message text transmitter. Energization of electromagnet 58*b* of the key tape transmitter causes operation of both transmitters, since the release of the main driving bail 42*b* of the key tape transmitter initiates release of the main driving bail 42*a* of the message transmitter by means of restarting lever 65 and latch trip lever 68.

However, in the normal transmission of an encrypted message, both electromagnets 58*a* and 58*b* are energized. If electromagnet 58*a* is not energized while electromagnet 58*b* is energized, main bail 42*a* of the message text transmitter would be latched during each cycle and would immediately thereafter be unlatched by the key tape transmitter main bail. Main bail 42*a* of the message text transmitter would then rise rapidly under the urging spring 46*a*, and possibly cause main bail drive pin 40*a* to hammer against the end of slot 39*a* during each cycle, giving rise to excessive noise and wear.

Although only one embodiment of the invention is shown in the drawings and described in the foregoing specification, it will be understood that the invention is not limited to the specific embodiment described, but is capable of modification and rearrangement and substitution of parts and elements without departing from the spirit of the invention.

What is claimed is:

1. In a telegraph set having two transmitters:
a normally dormant driver;
means for selectively coupling one of the transmitters to the driver for operation of said one transmitter;
means for selectively coupling the other of the transmitters to the driver for operation of the other transmitter;
means responsive to the coupling of said one transmitter to the driver for activating the driver; and
means responsive to the coupling of said other transmitter to the driver for operating the first-mentioned coupling means.

2. In a telegraph terminal:
a continuously-rotating drive source;
a drive shaft;
a first transmitter having an operative element cooperatively engageable with the drive shaft to be driven by the rotation thereof;
a clutch for coupling the drive shaft to the continuously-rotating drive source for rotation of the drive shaft in response to engagement of the operative element with the drive shaft;
a second transmitter having an operative element cooperatively engageable with the drive shaft to be driven by the rotation thereof;
means for selectively causing engagement of the operative element of the second transmitter with the drive shaft; and
means for causing engagement of the operative element of the first transmitter with the drive shaft in response to engagement of the operative element of the second transmitter with the drive shaft.

3. A telegraph transmitting terminal comprising:
a drive shaft;
a first tape transmitter having an operative element selectively engageable with the drive shaft to be driven thereby;
a continuously-rotating drive source;
means for coupling the drive shaft to the continuously-rotating drive source in response to engagement of the operative element of the first tape transmitter with the drive shaft;
a second tape transmitter having an operative element selectively engageable with the drive shaft to be driven thereby; and means for causing the engagement of the operative element of the first tape transmitter with the drive shaft in response to the engagement of the operative element of the second tape transmitter with the drive shaft.

4. In a telegraph transmitting terminal having a source of drive power and a first tape-controlled transmitter to be driven by the source of drive power, the improvement comprising:
a second tape-controlled transmitter to be driven by the source of drive power; and
means for establishing a driving connection between the source of drive power and the first tape-controlled transmitter in response to the establishment of a driving connection between the source of drive power and the second tape-controlled transmitter.

5. In a telegraph terminal:
a continuously-rotating drive source;
a drive shaft;
a clutch controllable for single revolution cycles and energizable for selectively coupling the drive shaft to the continuously-rotating drive source;
a first tape transmitter having an operative element selectively engageable with the drive shaft to be driven thereby;
a first start means for engaging said operative element in driven relationship with the drive shaft;
clutch trip means for energizing the clutch in response to the engagement of said operative element with the drive shaft;
a second tape transmitter having an operative element engageable with and driven by the drive shaft;
a second start means for engaging the operative element of the second transmitter in driven relationship with the drive shaft; and
means for causing engagement of the operative element of the first transmitter into driven relationship with the drive shaft in response to the engagement of the operative element of the second transmitter into driven relationship with the drive shaft.

6. In a telegraph set having two transmitters:
a motor;
a single-revolution clutch driven by the motor;
first and second cams driven by the clutch;
a first cam follower operable by the first cam to operate the first of the two transmitters;
a first magnet-operated latch holding the first cam follower out of operative relation to the first cam and for selectively releasing the first cam follower for operation by the first cam;
a second cam follower operable by the second cam to operate the second of the two transmitters;
a second magnet-operated latch for holding the second cam follower out of operative relation to the second cam and for selectively releasing the second cam follower for operation by the second cam;
means for triggering one cycle of operation of the single revolution clutch in response to release of the first latch; and
means responsive to the operation of the second latch by its magnet for operating the first latch independently of its magnet.

References Cited

UNITED STATES PATENTS

| | | | |
|---|---|---|---|
| 1,872,951 | 8/1932 | Hitt | 178—22 |
| 2,472,701 | 6/1949 | Goetz. | |
| 2,853,169 | 9/1958 | Usselmann | 192—116.5 |

THOMAS A. ROBINSON, Primary Examiner

U.S. Cl. X.R.

178—17, 53.1